Nov. 13, 1928.
W. T. PALMER
1,691,408
TIMING DEVICE
Filed March 18, 1927
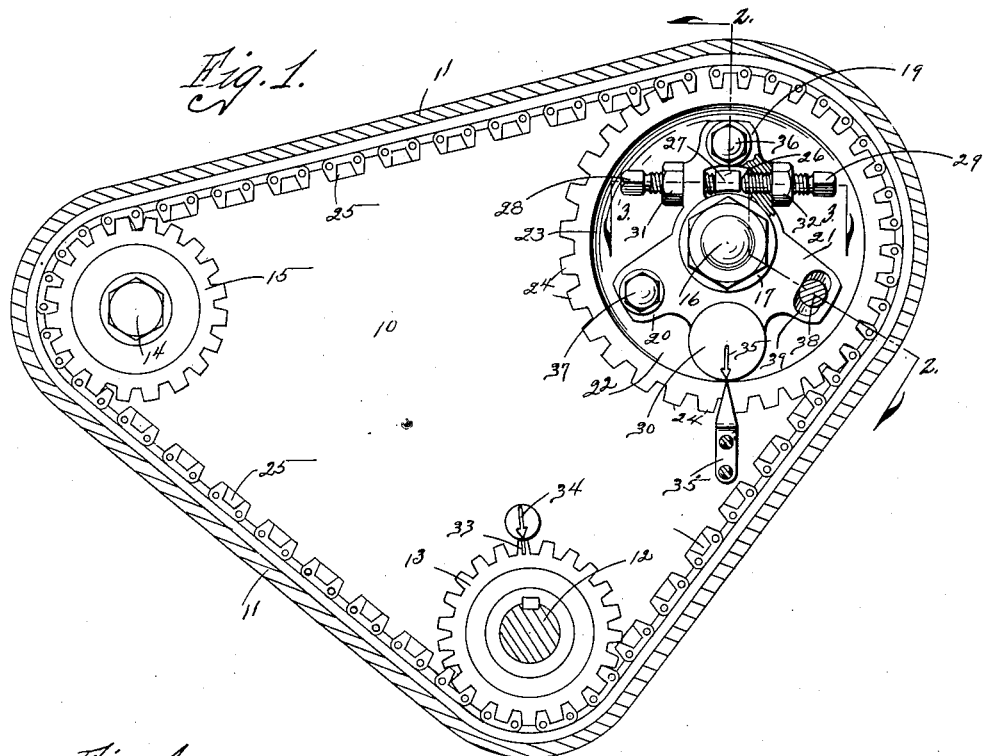
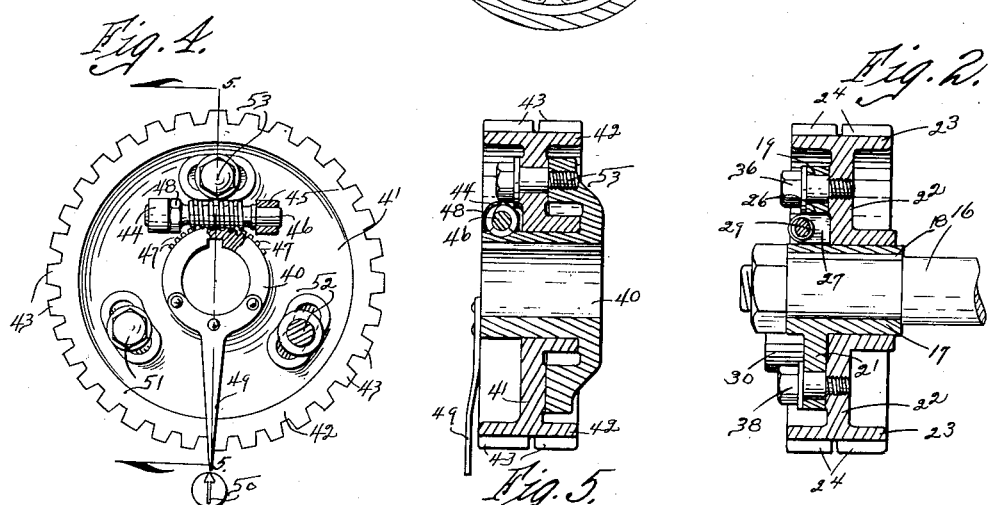
Inventor
WALTER T. PALMER
By M. Talbert Dick
Attorney Patented Nov. 13, 1928.

1,691,408

UNITED STATES PATENT OFFICE.

WALTER TUTTLE PALMER, OF DES MOINES, IOWA.

TIMING DEVICE.

Application filed March 18, 1927. Serial No. 176,571.

The principal object of this invention is to provide a means for retiming chain driven valves and the like, when the same have gotten out of time due to the wear of the chain.

More specifically the object of this invention is to retime chain driven valves and the like, when the same have gotten out of time due to the wear of the chain, by adjustably securing the chain driven sprocket wheel to the valve actuating shaft.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawings, in which:

Fig. 1 is a front view of my complete device in use on an internal combustion motor.

Fig. 2 is a side sectional view taken on line 2—2 of Fig. 1 and shows the means of adjustably securing the chain driven sprocket wheel to the valve actuating shaft.

Fig. 3 is a sectional view of the adjusting means and is taken on line 3—3 of Fig. 1.

Fig. 4 is a front view of a modified form of adjustably securing the chain driven sprocket wheel to the valve actuating shaft.

Fig. 5 is a side sectional view of the modified form and is taken on line 5—5 of Fig. 4.

Most all the automobiles now on the market have internal combustion motors that utilize chains for driving their various parts. It may safely be said that these chains are chiefly used for driving the ignition system and the valve actuating shaft or shafts. Both the ignition system and especially the valves must be properly timed with the motor and when the sprocket wheels and chains are new this is possible. However when the chains and sprockets get worn the complete timing throughout the motor is retarded and the efficiency of the motor is greatly reduced. The removal of one of the links of the chain will throw the timing of the motor as far off as was originally the case before the link was removed. These chains are made to give long service, but only a little wear will retard the timing, and it is always necessary to discard both chains and sprocket wheels long before their durable and economical qualities have been realized.

Although my device is especially adapted to internal combustion motors having their valves actuated by a chain in operative engagement with the crank shaft and the valves, it may be used to great advantage on many other machines as will be understood by those skilled in the art.

I have used the numeral 10 to designate the front end of an internal combustion motor having integrally formed thereon the gear housing 11. Extending into this housing is the crank shaft 12 and having permanently secured thereto and within the housing the sprocket wheel 13. Also extending into this housing is the generator or ignition shaft 14 having permanently secured thereto and within the housing the sprocket wheel 15. The numeral 16 designates a valve actuating shaft having one end entering the housing. It is on this shaft 16 and within the housing that I secure my sprocket wheel which is capable of adjustment relative to the shaft to which it is secured. I have designated the hub of this sprocket wheel by the numeral 17, which is secured to the shaft 16 by the key 18. Integrally formed on this hub portion and extending outwardly therefrom are the three projections 19, 20, and 21. Rotatably mounted on the hub portion and back of and adjacent these projections is the web 22 which supports and is an integral part of the drum 23. The numeral 24 designates sprocket teeth on the periphery of the drum 23. The numeral 25 desginates an endless chain embracing the sprocket wheel 13, the sprocket wheel 15, and my specially constructed sprocket wheel.

It will readily be seen that the drum portion of my sprocket wheel may be rotated in either direction without affecting the valve actuating shaft.

Integrally formed on the web 22 and extending into the hole 26 in the projection 19 is the lug 27. It will be noted in Fig. 1 that this hole has an inside diameter much greater than the outside diameter of the lug 27. Threaded into the projection 19, diametrically opposite from each other and each capable of engagement with the side of the lug 27 to which they are adjacent, are the set screws 28 and 29. When both of these screws are engaging the lug 27, my outer sprocket wheel portion will be securely attached to the shaft 16. By loosening one of these screws and tightening the other the sprocket wheel will be rotated slightly either to the right or left as the case may be, relative to the shaft 16. The numeral 30 designates a counter weight designed to counterbalance the screws 28, 29 and their lock nuts 31 and 32.

On the sprocket wheel 13 secured to the crank shaft of the motor is a mark 33 which tallies with the pointer 34 secured to the motor. Likewise on the hub member of my device is a mark 35 that tallies with the pointer 35' secured to the motor. When these points are all properly registering the valves will be in time. After the chain and sprocket wheels have become worn these points will not tally with each other. It will, however, be a simple matter to make them do so by adjusting the set screws 28 and 29.

To more securely hold the outer sprocket wheel portion to the hub portion, once the same has been properly adjusted, the cap screws 36, 37, and 38 are provided. These cap screws each pass through a slot 39 in one of the projections 19, 20 and 21, respectively and are threaded into the web 17. When adjusting my device these cap screws should first be loosened and then tightened after the adjustment. This is also true of the lock nuts 31 and 32.

Fig. 4 and Fig. 5 show a modified form of adjusting the outer portion of the sprocket wheel relative to the valve actuating shaft. The numeral 40 designates the hub portion and corresponds to the member 17 of the form heretofore described. Rotatably mounted on this hub is the web portion 41 having integrally formed thereon the drum 42. This drum has formed on its periphery the sprocket teeth 43, the same as the drum 23. Formed on the web portion 41 and spaced apart are the two bearing members 44 and 45. Journaled in these two bearing members is the worm 46 which is designed to be in engagement with the worm gear teeth 47 on the hub 40. It will readily be seen that if the worm 46 is rotated the drum portion of my sprocket wheel will be rotated relative to the valve actuating shaft to which it is secured. This relative rotation may be had in either direction by so rotating the worm. To facilitate the turning of this worm a screw head 48 is provided. Secured to the drum portion 40 which is to be secured to the valve actuating shaft is the pointer 49 designed to tally with the mark 50 on the motor. The cap screws 51, 52, and 53 correspond to the cap screws 36, 37, and 38 described in the first construction and answer the same purpose.

It will readily be seen by those skilled in the art that I have provided a means for easily and accurately timing valves and the like which are driven by a chain, no matter how badly the chain and sprocket wheels are worn.

In some cases it may be possible to only use the cap screws 36, 37, and 38, operating in the slots 39, to adjust and properly secure the outer portion of the sprocket wheel to the hub portion.

Some changes may be made in construction and arrangement of my improved timing device without departing from the real spirit and purpose of my invention and it is my intention to cover by my claims any modified forms of structure or use of mechanical equivalents which may be reasonably included within their scope.

I claim:

1. In a device of the class described, a shaft, a sprocket wheel permanently secured to said shaft, a mark on said sprocket wheel, a fixed pointer adjacent said sprocket wheel, a second shaft, a hub member permanently secured to said shaft, a sprocket wheel rotatably mounted on said hub member, projections on said hub member adjacent said sprocket wheel and each having a slot therein a cap screw extending into each slot and threaded into the sprocket wheel, one of said projections having a hole, a lug on said sprocket wheel and extending into said hole, a means for securing said lug in various positions in said hole, a mark on said hub member, a fixed pointer adjacent said hub member, and an endless chain engaging said two sprocket wheels.

2. In a device of the class described, a shaft, a hub member permanently secured to said shaft, a second hub member rotatably mounted on said first hub member and embracing a portion of the same, an outwardly extending annular disk integrally formed on one end of said last mentioned hub member, a sprocket wheel integrally formed on the marginal edge of said disk, projections on said first mentioned hub member adjacent said disk and each having a slot therein, a cap screw extending into each slot and threaded into said disk, one of said projections having a hole, a lug on said disk extending into said hole, and a set screw threaded in each side of the projection having the hole and capable of engaging the two sides of the lug respectively, said parts being so arranged that they all are approximately within the rim of the said sprocket wheel.

WALTER TUTTLE PALMER.